(12) United States Patent
Sher et al.

(10) Patent No.: US 11,308,399 B2
(45) Date of Patent: Apr. 19, 2022

(54) METHOD FOR TOPOLOGICAL OPTIMIZATION OF GRAPH-BASED MODELS

(71) Applicant: Jean-Patrice Glafkidès, Fontenay-sous-Bois (FR)

(72) Inventors: Yevgeniy Sher, Charleston, SC (US); Anton Zaleski, Minsk (BY); Jean-Patrice Glafkidès, Fontenay-sous-Bois (FR)

(73) Assignee: Jean-Patrice Glafkidès, Fontenay-sous-Bois (FR)

( * ) Notice: Subject to any disclaimer, the term of this patent is extended or adjusted under 35 U.S.C. 154(b) by 724 days.

(21) Appl. No.: 16/239,431

(22) Filed: Jan. 3, 2019

(65) Prior Publication Data
US 2019/0205762 A1    Jul. 4, 2019

Related U.S. Application Data

(60) Provisional application No. 62/613,514, filed on Jan. 4, 2018.

(51) Int. Cl.
*G06N 3/08* (2006.01)
*G06F 16/178* (2019.01)
(Continued)

(52) U.S. Cl.
CPC ......... *G06N 3/086* (2013.01); *G06F 16/1794* (2019.01); *G06F 16/9024* (2019.01);
(Continued)

(58) Field of Classification Search
CPC ...... G06N 3/086; G06N 3/082; G06N 3/0445; G06N 3/0472; G06F 16/1794; G06F 16/9024
(Continued)

(56) References Cited

U.S. PATENT DOCUMENTS

2017/0213156 A1* 7/2017 Hammond ................ G06F 8/31

OTHER PUBLICATIONS

Liu, et al., "Topological optimization models for communication network with multiple reliability goals", Computers and mathematics with applications 39 (2000) 59-69 (Year: 2000).*
(Continued)

*Primary Examiner* — Tsu-Chang Lee
(74) *Attorney, Agent, or Firm* — Maschoff Brennan

(57) ABSTRACT

A method may include receiving a graph-based model in a first format, including a static topology of the graph-based model. The method may also include encoding the graph-based model from the first format into a neural network topology optimizer (NNTO) readable format such that the topology of the encoded graph-based model is configured to be altered; creating a first group of entities based on at least a same portion of the encoded graph-based model; and performing a learning operation by tuning parameters of the first group of entities to produce an optimization score for each entity. Additionally, the method may include performing a validation operation; determining that an improvement in validation performance for at least one entity is within a threshold amount of improvement; selecting a solution entity; and adding the selected solution entity into the graph-based model in place of the same portion.

20 Claims, 3 Drawing Sheets

(51) Int. Cl.
*G06F 16/901* (2019.01)
*G06N 3/04* (2006.01)
*G06N 3/10* (2006.01)
*G06N 5/00* (2006.01)

(52) U.S. Cl.
CPC .......... *G06N 3/082* (2013.01); *G06N 3/0445* (2013.01); *G06N 3/0472* (2013.01); *G06N 3/084* (2013.01); *G06N 3/088* (2013.01); *G06N 3/105* (2013.01); *G06N 5/003* (2013.01)

(58) Field of Classification Search
USPC .......................................................... 706/25
See application file for complete search history.

(56) References Cited

OTHER PUBLICATIONS

Hardwick-Smith, W., et al., "Evolving Transferable Artificial Neural Networks for Gameplay Tasks via NEAT with Phased Searching," International Conference On Computer Analysis of Images and Patterns, Springer, Berlin, Heidelberg, pp. 39-51 (Jul. 9, 2017).

Liu, H., "Hierarchical Representations for Efficient Architecture Search," Arxiv. Org, Cornell University Library, 201 Olin Library, Cornell University Ithaca, NY, pp. 13 (Nov. 1, 2017).

Miikkulainen, R., et al., "Evolving Deep Neural Networks," Arxiv. org, Cornell University Library, 201 Olin Library Cornell University Ithaca, NY, p. 8 (Mar. 2, 2017).

Real, E., et al., "Large-Scale Evolution of Image Classifiers," Arxiv.org, pp. 18, (Mar. 3, 2017).

Yao, X., "Evolving arlificial neural networks" Proceedings of the IEEE, vol. 87, Issue 9, pp. 1423-1447 (Sep. 1999).

International Search Report dated Jun. 18, 2019 as received in Application No. PCT/IB2019/000058.

Written Opinion of the International Searching Authority dated Jun. 18, 2019 as received in Application No. PCT/IB2019/000058.

\* cited by examiner

METHOD FOR TOPOLOGICAL OPTIMIZATION OF GRAPH-BASED MODELS

FIELD

The application relates generally to a method for improving topologies of graph-based models.

BACKGROUND

A graph-based model such as a neural network learns from its experience to provide solutions through various types of machine learning methods such as supervised, semi-supervised or unsupervised learning methods, otherwise known as neuro-evolution. Neuro-evolution differs from methods which may require or incorporate a known solution at the outset. For the deep-learning network to achieve its objective, or to do so efficiently, sufficient computational power and/or correct topology of the deep-learning network may be determinative factors. The topology of the deep-learning network refers to the architectural structure of layers, nodes, inputs, outputs, weights, and the interconnections thereof.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the present disclosure may relate to a method that may include receiving a graph-based model of a deep-learning network in a first format not configured for to be altered and encoding the graph-based model from the first format into a neural network topology optimizer (NNTO) readable format such that the encoded graph-based model is configured to be altered. Additionally, the optimization method may include creating a first set of entities based on at least a portion of the encoded graph-based model, where each entity of the first set of entities may include a different topological mutation to at least the portion of the encoded graph-based model. Further, the optimization method may include tuning parameters of the first set of entities using a common training data set to produce an optimization score for each entity of the first set of entities, where the optimization score may be based on selectable features configured to be optimized. The method may also include performing a validation operation which may validate each entity of the first set of entities using a common validation data set. Additionally, the method may include determining an improvement in validation performance is within a threshold amount of improvement and selecting an entity of the first set of entities with the highest optimization score and that produced at least the threshold amount of improvement in the validation performance.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
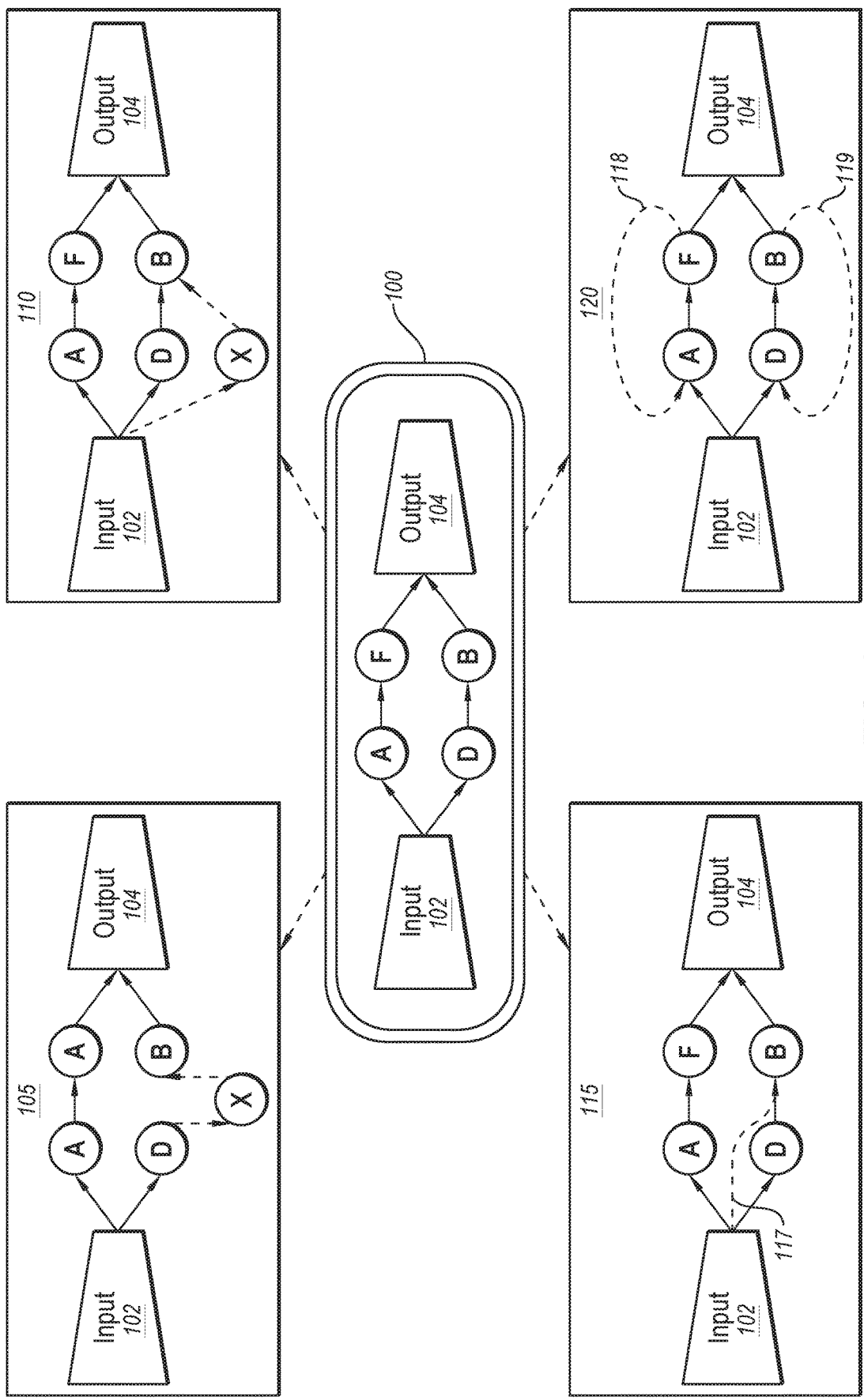
FIG. 1 illustrates example topology mutations to an example entity of a graph-based model.

A topology or architecture of a graph-based model may include topology of a deep neural network, a deep belief network, a recurrent neural network, or some other graph model such as a genetic programming model or a tree-based or forest-based machine learning model. The topology of graph-based models and the optimization thereof as described in the present disclosure may be applicable to a myriad of technical fields such as, for example, computer vision, speech recognition, natural language processing, audio recognition, social network filtering, machine translation, bioinformatics, drug design, agro-food, business activity, human resources, insurance, automobile industry, education, health care, and public relations. Additionally, the topology of the graph-based model may affect a functionality, a compatibility, or an ability to achieve a particular objective/solve a problem within a technical field (e.g., any of the example technical fields mentioned above).

As used herein, the term "optimize" should be interpreted to mean "improved," "enhanced" or "local optima," and not necessarily as "absolute optima," "true optimization" or the "best," although an "absolute optima" or "best" may still be covered by the present disclosure. For example, an optimization process may improve upon a solution that was there previously, may find the best solution, or may verify that an existing solution is a "local optima" or an "absolute optima" and thus should not be modified or changed.

For example, an existing topology for a given graph-based model may be inefficient due to at least an unnecessarily oversized topology with excess computational overhead, decreased performance (e.g., speed performance), or unnecessary/forced parameters limiting compatibility (e.g., for installation on embedded devices) or functionality for a given objective. For example, some graph-based model topologies such as those found in convolution neural networks (CNN), back-propagation neural networks (BPNN), and Kohonen networks may result in or provide a standard topology that is not tailored to the objective or problem at hand, which may result in one or more of the inefficiencies described above. Existing graph-based models may include a topology directed only towards "classic" problems of a particular nature without customization and without tailored optimization.

Some embodiments described in the present disclosure may include a method for optimizing graph-based models. For example, an existing topology or graph-based model may be imported into a software system. The existing topology may correspond to an initial library with particular topological limits imposed by the initial library. With provided expected gains and various calculation rules, the software system may analyze the existing topology. Upon analysis, optimization of the existing topology may proceed. For example, topological optimization may include applying mutations between learning phases such as addition of connections, nodes, layers, extraction of nodes, and removal of useless connections. The entities resulting from the mutations may then be compared to select the entity most consistent with the expected gain. The enhanced, optimized network may then be made available to the client.

FIG. 1 illustrates example topology mutations to an example entity 100 of a graph-based model, all arranged according to one or more embodiments of the present disclosure. As illustrated, the entity 100 includes input 102, nodes A/F/D/B, and output 104. As referred to in the present disclosure, the term "entity" may refer to a portion of a graph-based model. Thus, in some embodiments, the entity 100 may include a portion of a graph-based model, for example, as received from an existing graph-based model with a topology of the nodes A/F/D/B positioned between the input 102 and the output 104.

In some embodiments, the topology of the nodes A/F/D/B in the entity may include the nodes A and F in series with each other and the nodes D and B in series with each other. Additionally or alternatively, the nodes A/F may be in parallel with the nodes D/B. Though depicted in FIG. 1 in an example topology as described above, any suitable topology of nodes, number of nodes, and/or connections therebetween may be configured in the entity 100. For example, the entity 100 may include hundreds or thousands of nodes. In some embodiments, the term "node" as referred to in the present disclosure may include a neuron and/or a block element that includes individual neurons. Thus, in some embodiments, one or more of the nodes A/F/D/B in the entity 100 may include a neuron and/or a block element of multiple neurons.

In some embodiments, the input 102 may include data such as raw data obtained from a sensor, such as a camera sensor, an accelerometer, a photodiode, and/or any suitable type of sensor configured to obtain data via some manner of sensing an environment. Additionally or alternatively, the input 102 may include equations, vectors, matrices, scenarios, problems, deficiencies, defects, and/or any other suitable type of input. In some embodiments, the output 104 may include portions of the data obtained as the input 102, but transformed in some way due to the nodes A/F/D/B positioned between the input 102 and the output 104. For example, the output 104 may be based on the input 102 and may include an extrapolation of the input 102, an interpolation of the input 102, a solution, a probability-based outcome, a trend, a variable-based relationship, a diagram, a chart, a graph, and/or any suitable type of output.

Additionally or alternatively, the output 104 may be based on the topology of the nodes, such as the nodes A/F/D/B in the entity 100 of FIG. 1. For example, any of the mutations shown in entities 105, 110, 115, and 120 may, with the same input 102, have a different output 104 relative to the output 104 for the entity 100 and/or relative to each other. Additionally or alternatively, any of the mutations shown in entities 105, 110, 115, and 120 may, with the same input 102, achieve the output 104 in a different manner relative to the entity 100 and/or relative to each other. For example, some mutations may achieve the output 104 faster, with less computational overhead, with more accuracy or consistency, with less side-effects to other portions of the graph-based model, and/or any other suitable type of difference.

The entity 105 illustrates an example mutation of the entity 100 such that a node X is added in series with nodes D and B, and between nodes D and B. The entity 110 illustrates an example mutation of the entity 100 such that the node X is added to be in parallel with node D between the input 102 and node B. The entity 115 illustrates an example mutation of the entity 100 such that a connection 117 is added to directly connect the input 102 and node B. The entity 120 illustrates an example mutation of the entity 100 such that multiple connections 118 and 119 are added, in which the connection 118 is a recurrent connection between node F and node A, and the connection 119 is a recurrent connection between nodes B and node D. In these or other embodiments, more or fewer entities may be created based on the entity 100. Additionally or alternatively, any suitable mutation to any of the entities 100-120 may be added, omitted, or otherwise combined.

Figure 2:
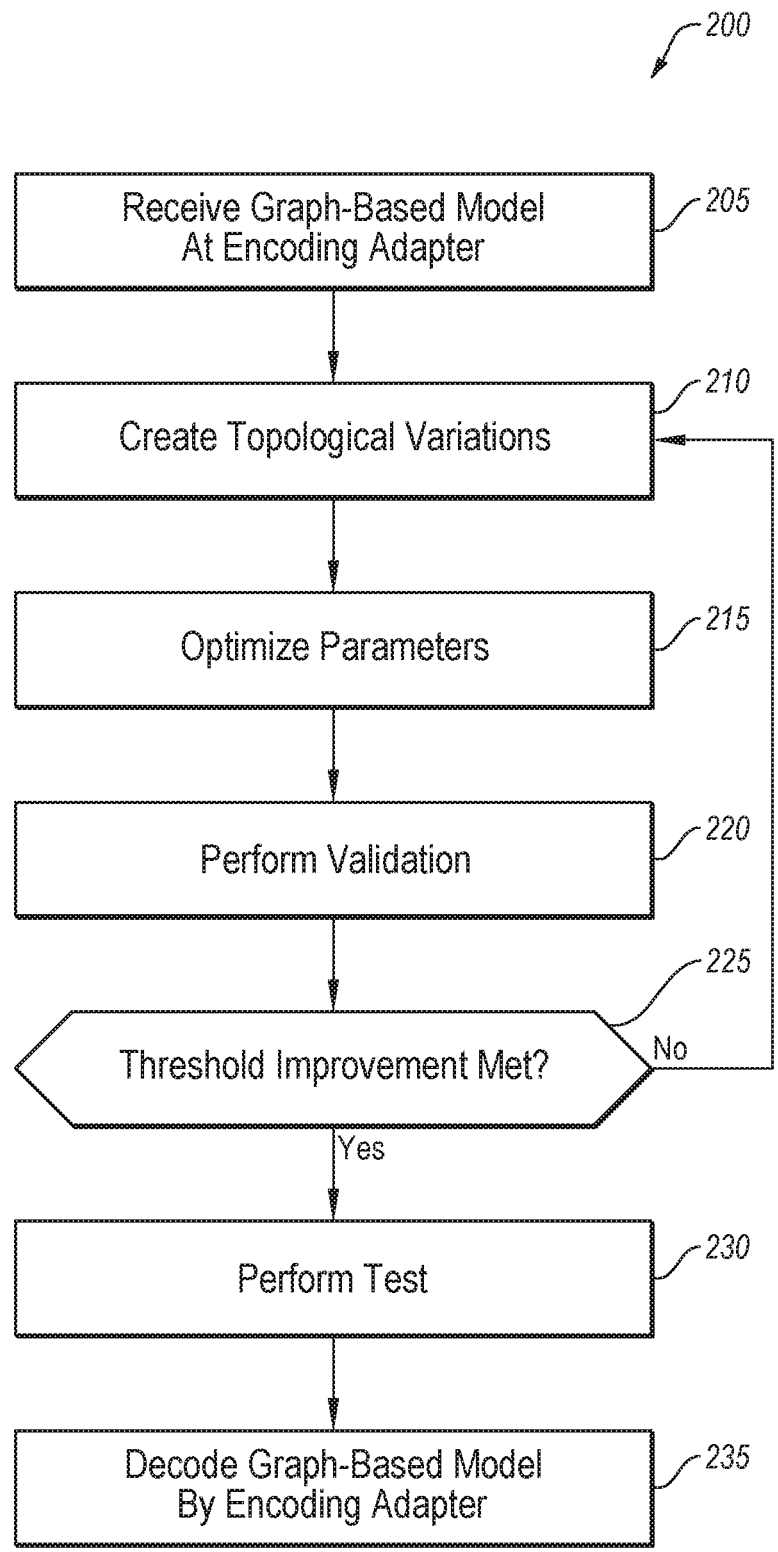
FIG. 2 illustrates an example flow diagram of a method for topological optimization of graph-based models.

FIG. 2 illustrates an example flow diagram of a method 200 for topological optimization of graph-based models. The method 200 may be arranged in accordance with at least one embodiment described in the present disclosure. The method 200 may be performed, in whole or in part, in some embodiments by the software system and/or a processing system, such as a system 300 described below in conjunction with FIG. 3. In these and other embodiments, some or all of the steps of the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 205, where a graph-based model in a first format may be received at an encoding adapter. The first format may be any format associated with a graph-based model, including, for example, a deep neural network, a deep belief network, a recurrent neural network, or some other graph model such as a genetic programming model or a tree-based or forest-based machine learning model. Additionally, the first format may not be configured to be altered. For example, the first format may be a protected format where any edits or changes may not be allowed. The encoding adapter may then encode the graph-based model from the first format into a neural network topology optimizer (NNTO) readable format, in which the encoded graph-based model may then be altered. In this manner, the software system may be able to manipulate a topology associated with the graph-based model.

In some embodiments, the NNTO readable format may include the limitations of the first format or otherwise retain in memory what the limitations were upon initial encoding. In other embodiments, the NNTO readable format may omit, for example, permanently, the limitations of the first format. For example, in cases where the first format is no longer necessary or decoding back to the first format is not required, the NNTO readable format may be configured to delete any limitations associated with the first format.

At block 210, topological variations in the graph-based model may be created. For example, a first set of entities may be created based on at least a portion of the encoded graph-based model in the NNTO readable format, where each entity of the first set of entities may include a different topological mutation or variation to the portion of the encoded graph-based model as compared to the other mutations. Examples of such topological mutations may include addition of connections, nodes, layers, extraction of nodes, and removal of one or more connections (such as connections that do not improve the functioning of the graph-based model).

Additionally, the term "unique" may refer to the relationship of each entity of the first set of entities relative to each other. For example, as shown in FIG. 1, the entity 105 illustrates an example mutation of the entity 100 such that a node X is added in series with nodes D and B, and between nodes D and B. The entity 110 illustrates an example mutation of the entity 100 such that the node X is added to be in parallel with node D between the input 102 and node B. The entity 115 illustrates an example mutation of the entity 100 such that a connection 117 is added to directly connect the input 102 and node B. The entity 120 illustrates an example mutation of the entity 100 such that multiple connections 118 and 119 are added, in which the connection 118 is a recurrent connection between node F and node A, and the connection 119 is a recurrent connection between nodes B and node D. In these or other embodiments, more or fewer entities may be created based on the entity 100. Additionally or alternatively, any suitable mutation to any of the entities 100-120 may be added, omitted, or otherwise combined. Thus, each entity may be unique relative to each other, varying at least by one different mutation.

At block 215, parameters of the various entities created at block 210 may be optimized. As used herein, the term "parameters" of the various entities may refer to decision variables such as the weights and biases corresponding to various entities or portions of entities in the topology of the encoded graph-based model. For example, a call-wait time may be a weighted variable in determining the number of on-duty call receptionists at a call center at a given time of day (e.g., may weigh more heavily in a recommended number of on-duty call receptionists compared to other factors). Additionally or alternatively, decision variables may include various types of functions such as activation functions, a number of learning cycles or iterations, a number of nodes, a number of connections, etc. Thus, parameter optimization at block 215 may include optimization of decision variables, while topology mutations at block 210 may determine how, when, and/or where the decision variables are determined.

In some embodiments, using a common training data set, an optimization score may be produced for each unique entity, where the optimization score may be based on selectable features configured to be optimized. In other embodiments, no training data may be used. For example, in simulation scenarios, a simulator or simulation software may simulate an environment to produce the optimization score for each unique entity. Block 215 may include or be part of a learning phase or learning operation in which the parameters of the various entities created at block 210 may be tuned, perturbed, and varied in response to optimization scores and/or in response to given inputs and/or in response to selectable features being selected for optimization. For example, a client or user may select various features such as a number of hidden layers, specific weights for various nodes, etc. to be optimized, which may correspond to an overall performance goal. The performance goal may include better efficiency, lower error margins, reduced sizing, or increased speed to name a few examples. The performance goal may be client-defined and may largely be unattainable solely using the original/base topology of the graph-based model.

Additionally or alternatively, optimization of the parameters at block 215 may depend on the type of graph-based model being optimized. For example, if the graph-based model is a deep neural network, then contrastive divergence, back propagation, or neuro-evolution may be used to optimize one or more of the parameters of the first set of entities or determine various relationships between the first set of entities and the deep-learning network. For example, one or more of contrastive divergence, back propagation, and/or neuro-evolution may help calculate the gradient relationship between a graph-based model's parameters and error, which relates to a functionality and ability of the deep-learning network to learn.

In some embodiments, the optimization score for a given entity may correlate to a degree of consistency with the performance goal. For example, a high optimization score may correspond to a well-performing entity consistent with the performance goal, while a low optimization score may correspond to a poor-performing entity inconsistent with the performance goal.

In some embodiments, one or more aspects of block 215 may be performed on a client side, such as with a client device or client server, a client testing engine, and/or a client corpus of data. In these or other embodiments, the method 200 may, at block 215, include receiving from a client device an optimization score. Additionally or alternatively, block 215 may include receiving from the client device, data relating to one or more learning operations as described above that may be performed on the client side.

At block 220, a validation operation may be performed which may validate each entity of the first plurality of entities using a common validation data set. For example, the validation operation may prove or validate the optimization score for each entity to be accurate or inaccurate based on a validation performance using the common validation data set. The validation operation may provide another data point (e.g., the validation performance), which is separate from the optimization score obtained during optimization using training data. The additional data point of the validation operation may thus provide further assurances that mutations to the topology of the encoded graph-based model are (or are not) potentially appropriate and potentially worth implementing in a final-optimized topology.

In some embodiments, one or more aspects of block 220 may be performed on a client side, such as with a client device or client server, a client testing engine, and/or a client corpus of data. In these or other embodiments, the method 200 may, at block 220, include receiving from the client device, data relating to a validation operation as described above that may be performed on the client side. In this manner, data privacy, proprietary information, trade secrets, etc. may be safeguarded on the client side. For example, client data and client parameters of the graph-based model (e.g., synaptic weights) need not be shared with the graph-based model to a server side performing aspects of the method 200 (e.g., creating topological variations in block 210). Instead, a topology of the graph-based model and meta-parameters (e.g., general purpose parameters) may be exchanged between the client side and the server side without client data and client parameters.

At block 225, an improvement in validation performance may be determined to be within a threshold amount of improvement. For example, the threshold amount of improvement may be client-defined and may correspond to one of the selectable features selected by the client, for example, approximately X % reduction in computational overhead or approximately X % increase in network speed, etc. If the validation performance for a given entity meets or exceeds the threshold amount of improvement, the method 200 may continue to block 230.

Otherwise, if the validation performance for a given entity fails to meet or exceed the threshold amount of improvement, then blocks 210, 215, and 220 may be iteratively repeated until the validation performance for one or more entities meets or exceeds the threshold amount of improvement, and/or until a target number of iterations is reached. In these or other embodiments, blocks 210, 215, and 220 may be performed using a second set of entities based on one or both of the encoded graph model without mutations and the first set of entities. For example, the second set of entities may include unique mutations done to the first set of entities and/or unique mutations done to the original encoded graph-based model without mutations. In this manner, unique transformations in all forms of combinations may be iteratively performed until achieving at least the threshold amount of validation performance is observed. Additionally or alternatively, one or more entities of the encoded graph-based model may fail to achieve at least the threshold amount of performance (e.g., failing entities). In these or other embodiments, the encoded graph-based model, as a whole, may nonetheless meet or exceed the threshold amount of performance due to other various entities (e.g., successful entities) performing significantly better than the failing entities and/or the failing entities being topographically or functionally insignificant relative to the successful entities. In some embodiments, failing entities may be acceptable, while in other embodiments the failing entities may be unacceptable.

At block 230, a final test may be performed using an independent data set. For the final test, the entities used may be selected entities with high optimization scores and/or selected entities that produced at least the threshold amount of improvement in the validation performance. In some embodiments, the final test may be performed prior to sending the improved graph-based model to the client device. Additionally or alternatively, the final test may be performed without decoding in block 235. For example, in some embodiments, one or more aspects of block 230 may be performed on a client side, such as with an NNTO runtime application, a client device or client server, a client testing engine, and/or a client corpus of data. In this manner, data privacy, proprietary information, trade secrets, etc. may be safeguarded on the client side. For example, client data and client parameters of the graph-based model (e.g., synaptic weights) need not be shared with the graph-based model to a server side performing aspects of the method 200 (e.g., creating topological variations in block 210). Instead, a topology of the graph-based model and meta-parameters (e.g., general purpose parameters) may be exchanged between the client side and the server side without client data and client parameters. In these or other embodiments, the NNTO runtime application may enable a client device or client server to execute the encoded graph-based model without decoding back to the first format from the NNTO readable format.

At block 235, the encoded graph-based model in the NNTO readable format may be decoded by the encoding adapter back to the first format or any other format as may be desirable. In some embodiments, blocks 205 and 235 may happen multiple times and/or for any of blocks 210-230 in the method 200. For example, in some embodiments, to perform the learning operations of block 215, the validation operations of block 220, and/or the final testing of block 230, the graph-based model may be encoded and decoded as desired to enable client-device functionality and compatibility for performing aspects of one or more blocks of the method 200.

Figure 3:
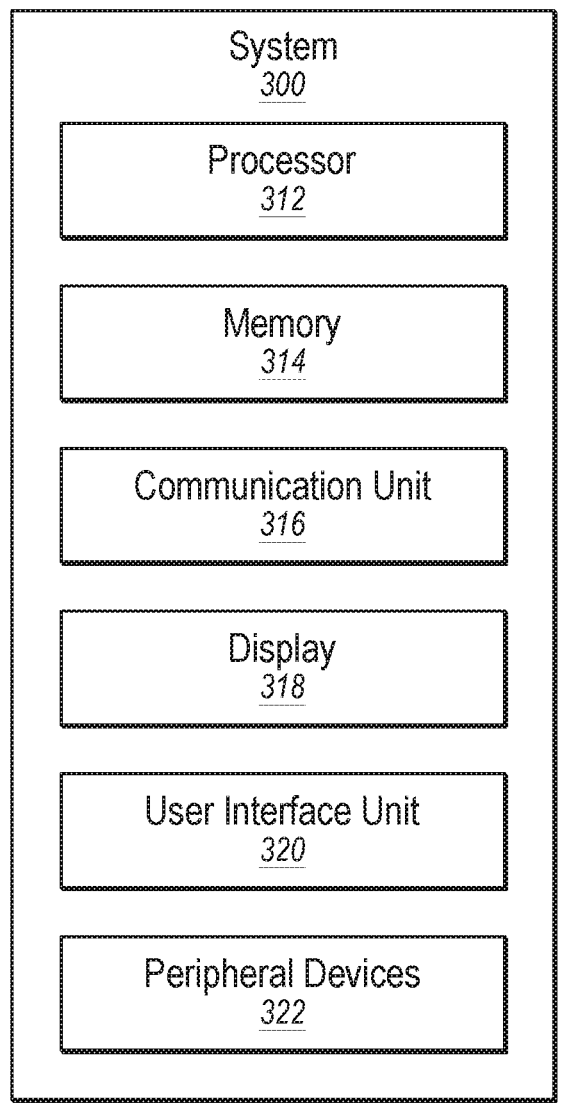
FIG. 3 illustrates an example system that may be used in topological optimization of graph-based models.

FIG. 3 illustrates an example system 300 that may be used in topological optimization of graph-based models. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described in this disclosure. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to topological optimization of graph-based models. In these and other embodiments, instructions may be used to perform one or more operations or functions described in the present disclosure.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 316 may permit data to be exchanged with a network and/or any other devices or systems described in the present disclosure.

The display 318 may be configured as one or more displays, like an LCD, LED, or other type of display. For example, the display 318 may be configured to present topologies, indicate mutations to topologies, indicate warning notices, show validation performance improvement values, display weights, biases, etc., and other data as directed by the processor 310.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display 318 may be combined.

The peripheral devices 322 may include one or more devices. For example, the peripheral devices may include a sensor, a microphone, and/or a speaker, among other peripheral devices.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," and "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
receiving a graph-based model in a first format, including a topology of the graph-based model in which the topology of the graph-based model is static;
encoding the graph-based model from the first format into a neural network topology optimizer (NNTO) readable format such that the topology of the encoded graph-based model is configured to be altered;
creating a first plurality of entities based on at least a same portion of the encoded graph-based model, each entity of the first plurality of entities including a different topological mutation to at least the same portion of the encoded graph-based model;
performing a learning operation by tuning parameters of the first plurality of entities to produce an optimization score for each entity of the first plurality of entities, the optimization score based on selectable features configured to be optimized;
performing a validation operation which validates each entity of the first plurality of entities using a common validation data set;
determining that an improvement in validation performance for at least one entity of the first plurality of entities is within a threshold amount of improvement;
selecting a solution entity of the first plurality of entities with a highest optimization score and that produced at least the threshold amount of improvement in the validation performance; and
adding the selected solution entity into the graph-based model in place of the same portion.

2. The method of claim 1, further comprising, after selecting the solution entity of the first plurality of entities:
creating a second plurality of entities, each entity of the second plurality of entities including a different topological mutation to at least one entity of the first plurality of entities;
performing a second learning operation by tuning parameters of the second plurality of entities to produce an optimization score for each entity of the second plurality of entities, the optimization score based on the selectable features configured to be optimized;
performing a second validation operation which validates each entity of the second plurality of entities using the common validation data set; and
determining that an improvement in validation performance for at least one entity of the second plurality of entities is not within the threshold amount of improvement.

3. The method of claim 2, wherein at least one entity of the second plurality of entities includes a different topological mutation to the same portion of the encoded graph-based model without mutations.

4. The method of claim 2, further comprising, in response to determining that an improvement in validation performance for at least one entity of the second plurality of entities is not within the threshold amount of improvement:
creating an $n^{th}$ plurality of entities, each entity of the $n^{th}$ plurality of entities including a different topological mutation to at least one entity of the first plurality of entities through the $n-1^{th}$ plurality of entities;
performing an $n^{th}$ learning operation by tuning parameters of the $n^{th}$ plurality of entities to produce an optimization score for each entity of the $n^{th}$ plurality of entities, the optimization score based on the selectable features configured to be optimized; and
performing an $n^{th}$ validation operation which validates each entity of the $n^{th}$ plurality of entities using the common validation data set.

5. The method of claim 4, wherein:
the $n^{th}$ plurality of entities, the $n^{th}$ learning operation, and the $n^{th}$ validation operation correspond to an $n^{th}$ iteration in which the $n^{th}$ iteration is a target number of iterations for attempts at improving validation performance for at least one entity of the second plurality of entities through the $n^{th}$ plurality of entities to be within the threshold amount of improvement; and
the $n^{th}$ iteration is a last iteration if the validation performance is not within the threshold amount of improvement.

6. The method of claim 4, further comprising:
determining that an improvement in validation performance for at least one entity of the $n^{th}$ plurality of entities is within the threshold amount of improvement;
selecting an entity of the $n^{th}$ plurality of entities with the highest optimization score and that produced at least the threshold amount of improvement in the validation performance; and
adding the selected solution entity into the graph-based model.

7. The method of claim 1, wherein the learning operation is performed using a common training data set or using a simulator to simulate an environment without the common training data set.

8. The method of claim 1, further comprising decoding the graph-based model from the NNTO readable format to the first format.

9. The method of claim 1, further comprising performing a final test using an independent test data set.

10. The method of claim 1, further comprising, after improvement to the graph-based model with the adding of the solution entity, sending the graph-based model to a client device for running on an NNTO runtime application.

11. A system comprising:
non-transitory computer readable media that include instructions thereon that, in response to execution by one or more processors, control performance of operations comprising:
receive a graph-based model in a first format, including a topology of the graph-based model in which the topology of the graph-based model is static;
encode the graph-based model from the first format into a neural network topology optimizer (NNTO) readable format such that the topology of the encoded graph-based model is configured to be altered;
create a first plurality of entities based on at least a same portion of the encoded graph-based model, each entity of the first plurality of entities including a different topological mutation to at least the same portion of the encoded graph-based model;
perform a learning operation by tuning parameters of the first plurality of entities to produce an optimization score for each entity of the first plurality of entities, the optimization score based on selectable features configured to be optimized;
perform a validation operation which validates each entity of the first plurality of entities using a common validation data set;
determine that an improvement in validation performance for at least one entity of the first plurality of entities is within a threshold amount of improvement;
select a solution entity of the first plurality of entities with a highest optimization score and that produced at least the threshold amount of improvement in the validation performance; and
add the selected solution entity into the graph-based model in place of the same portion.

12. The system of claim 11, wherein the operations further comprise, after the selecting the solution entity of the first plurality of entities:

creating a second plurality of entities, each entity of the second plurality of entities including a different topological mutation to at least one entity of the first plurality of entities;

performing a second learning operation by tuning parameters of the second plurality of entities to produce an optimization score for each entity of the second plurality of entities, the optimization score based on the selectable features configured to be optimized;

performing a second validation operation which validates each entity of the second plurality of entities using the common validation data set; and determining that an improvement in validation performance for at least one entity of the second plurality of entities is not within the threshold amount of improvement.

13. The system of claim 12, wherein at least one entity of the second plurality of entities includes a different topological mutation to the same portion of the encoded graph-based model without mutations.

14. The system of claim 12, wherein the operations further comprise, in response to determining that an improvement in validation performance for at least one entity of the second plurality of entities is not within the threshold amount of improvement:

creating an $n^{th}$ plurality of entities, each entity of the $n^{th}$ plurality of entities including a different topological mutation to at least one entity of the first plurality of entities through the $n-1^{th}$ plurality of entities;

performing an $n^{th}$ learning operation by tuning parameters of the $n^{th}$ plurality of entities to produce an optimization score for each entity of the $n^{th}$ plurality of entities, the optimization score based on the selectable features configured to be optimized; and performing an $n^{th}$ validation operation which validates each entity of the $n^{th}$ plurality of entities using the common validation data set.

15. The system of claim 14, wherein:

the $n^{th}$ plurality of entities, the $n^{th}$ learning operation, and the $n^{th}$ validation operation correspond to an $n^{th}$ iteration in which the $n^{th}$ iteration is a target number of iterations for attempts at improving validation performance for at least one entity of the second plurality of entities through the $n^{th}$ plurality of entities to be within the threshold amount of improvement; and the $n^{th}$ iteration is a last iteration if the validation performance is not within the threshold amount of improvement.

16. The system of claim 14, wherein the operations further comprise:

determining that an improvement in validation performance for at least one entity of the $n^{th}$ plurality of entities is within the threshold amount of improvement;

selecting an entity of the $n^{th}$ plurality of entities with the highest optimization score and that produced at least the threshold amount of improvement in the validation performance; and adding the selected solution entity into the graph-based model.

17. The system of claim 11, wherein the learning operation is performed using a common training data set or using a simulator to simulate an environment without the common training data set.

18. The system of claim 11, wherein the operations further comprise decoding the graph-based model from the NNTO readable format to the first format.

19. The system of claim 11, wherein the operations further comprise, after improvement to the graph-based model with the adding of the solution entity, sending the graph-based model to a client device for running on an NNTO runtime application.

20. A system, comprising:

one or more processors;

non-transitory computer readable media that include instructions thereon that, in response to execution by the one or more processors, control performance of operations comprising:

receive a graph-based model in a first format, including a topology of the graph-based model in which the topology of the graph-based model is static;

encode the graph-based model from the first format into a neural network topology optimizer (NNTO) readable format such that the topology of the encoded graph-based model is configured to be altered;

create a first plurality of entities based on at least a same portion of the encoded graph-based model, each entity of the first plurality of entities including a different topological mutation to at least the same portion of the encoded graph-based model;

receive an optimization score for each entity of the first plurality of entities, the optimization score based on selectable features configured to be optimized;

receive data relating to a validation operation which validates each entity of the first plurality of entities;

determine that an improvement in validation performance for at least one entity of the first plurality of entities is within a threshold amount of improvement;

select a solution entity of the first plurality of entities with a highest optimization score and that produced at least the threshold amount of improvement in the validation performance; and add the selected solution entity into the graph-based model in place of the same portion.

* * * * *